United States Patent
Mizusaki et al.

(10) Patent No.: US 7,955,714 B2
(45) Date of Patent: *Jun. 7, 2011

(54) COATING COMPOSITION FOR A METAL, AND METAL MATERIAL HAVING A COATING OF SUCH COATING COMPOSITION

(75) Inventors: Toru Mizusaki, Echizen (JP); Shuichiro Shinohara, Echizen (JP)

(73) Assignee: Nissin Chemical Industry Co., Ltd., Echizen-Shi (JP)

( * ) Notice: Subject to any disclaimer, the term of this patent is extended or adjusted under 35 U.S.C. 154(b) by 199 days.

This patent is subject to a terminal disclaimer.

(21) Appl. No.: 11/898,077

(22) Filed: Sep. 7, 2007

(65) Prior Publication Data

US 2008/0063893 A1 Mar. 13, 2008

(30) Foreign Application Priority Data

Sep. 8, 2006 (JP) ................................. 2006-243740

(51) Int. Cl.
  B32B 15/08   (2006.01)
  B32B 15/082  (2006.01)
  B32B 15/09   (2006.01)
  B32B 15/092  (2006.01)
  B32B 15/095  (2006.01)

(52) U.S. Cl. ..................... 428/626; 428/418; 428/425.8; 428/457; 428/458; 428/461

(58) Field of Classification Search .................. None
See application file for complete search history.

(56) References Cited

U.S. PATENT DOCUMENTS

| | | | | |
|---|---|---|---|---|
| 4,172,064 A | * | 10/1979 | Keeler ........................... | 524/762 |
| 4,385,138 A | * | 5/1983 | Sagane et al. .................. | 523/402 |
| 5,308,389 A | * | 5/1994 | Russo et al. ............... | 427/385.5 |
| 5,650,543 A | | 7/1997 | Medina | |
| 2003/0078307 A1 | * | 4/2003 | Shinohara et al. ............. | 516/113 |
| 2004/0242447 A1 | * | 12/2004 | Mizusaki et al. .............. | 510/175 |
| 2006/0128831 A1 | * | 6/2006 | Cook et al. ...................... | 523/160 |

FOREIGN PATENT DOCUMENTS

| | | |
|---|---|---|
| JP | 63-84671 A | 4/1988 |
| JP | 5-140491 A | 6/1993 |
| JP | 7-188087 A | 7/1995 |
| JP | 9-48943 A | 2/1997 |
| JP | 2000-104015 A | 4/2000 |
| JP | 2002-129356 A | 5/2002 |
| JP | 2002-348500 | 12/2002 |
| JP | 2003-55776 A | 2/2003 |
| JP | 2003-113397 A | 4/2003 |
| JP | 2003-253599 A | 9/2003 |
| JP | 2004-66047 A | 3/2004 |
| JP | 2005-154912 A | 6/2005 |
| JP | 2005154912 A | * 6/2005 |
| JP | 2005-248310 A | 9/2005 |
| JP | 2005-272619 A | 10/2005 |
| WO | WO-93/22387 A | 11/1993 |
| WO | WO-01/19934 A1 | 3/2001 |
| WO | WO-03/059971 A1 | 7/2003 |

OTHER PUBLICATIONS

Database WPI Week 200548 Derwent Publications Ltd., London, GB; AN-2005-470771 XP002458276.

* cited by examiner

*Primary Examiner* — Monique R Jackson
(74) *Attorney, Agent, or Firm* — Birch, Stewart, Kolasch & Birch, LLP

(57) ABSTRACT

A coating composition for a metal is provided. The coating composition comprises a synthetic resin solid content (A); a filler (B); and a mixture of (C-1) at least one member selected from an acetylene glycol represented by the following general formula (1):

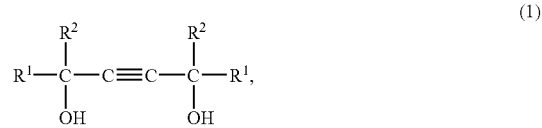

(1)

an ethylene oxide-propylene oxide block adduct of an acetylene glycol represented by the following general formula (2):

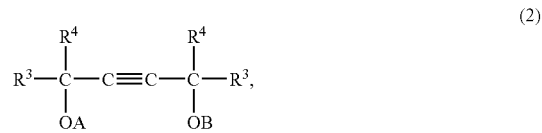

(2)

and an ethylene oxide-propylene oxide random adduct of an acetylene glycol represented by the following general formula (3):

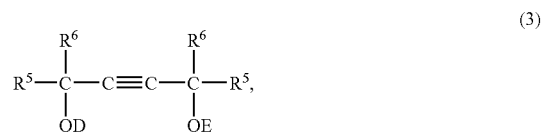

(3)

and (C-2) a polyoxyalkylene alkyl ether having an HLB of 8 to 18 represented by the following general formula (4):

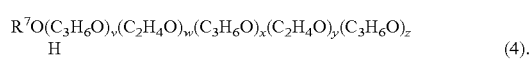

(4).

10 Claims, No Drawings

COATING COMPOSITION FOR A METAL, AND METAL MATERIAL HAVING A COATING OF SUCH COATING COMPOSITION

CROSS-REFERENCE TO RELATED APPLICATION

This non-provisional application claims priority under 35 U.S.C. §119(a) on Patent Application No. 2006-243740 filed in Japan on Sep. 8, 2006, the entire contents of which are hereby incorporated by reference.

TECHNICAL FIELD

This invention relates to a coating composition for a metal which exhibits excellent rust preventive properties simultaneously with improved water resistance and good adhesion to the metal. This invention also relates to a metal material having a coating formed by such coating composition.

BACKGROUND ART

Lead salt rust preventive pigments such as minium, lead cyanamide, and calcium metaplumbate, and metal chromate rust preventive pigments such as basic zinc chromate and strontium chromate had once been the main reagent used for preventing the rust. Use of such reagent, however, was gradually restricted in consideration of the health hazard and environmental conservation. Since then, non-polluting, non-toxic rust preventive pigments have been developed. Exemplary such rust preventive pigments include metal phosphates such as zinc phosphate, calcium magnesium phosphate, titanium phosphate, and silica phosphate; condensed metal phosphates such as aluminum tripolyphosphate; metal phosphorite such as zinc phosphorite, calcium phosphorite, strontium phosphorite, and aluminum phosphorite; zinc molybdate, calcium molybdate, barium borate, and zinc borate. Use of these non-polluting, non-toxic rust preventive pigments did not bring a major change since rust preventive pigments were still used.

JP-A 5-140491 (Patent Document 1) discloses a waterborne etch-resistant coating composition for a metal plate produced by adding a surfactant and an acetylene alcohol compound and/or an acetylene glycol compound. In this coating composition, the resin component is uniformly distributed on the metal surface by the use of a surfactant and the use of an acetylene alcohol compound combined with the acetylene glycol compound, and the etch-resistance is realized by the resin.

JP-A 2000-104015 (Patent Document 2) discloses a thermosetting rust preventive coating composition comprising a water-borne polyurethane resin having the thermosetting property. Use of the urethane resin, however, is associated with the drawback of high cost.

DISCLOSURE OF THE INVENTION

The present invention has been completed in view of the situation as described above, and an object of the present invention is to provide a coating composition for a metal which does not contain the rust preventive pigment including the toxic lead salt and chromium salt rust preventive pigments, and which exhibit excellent water resistance and adhesion to the metal. Another object of the present invention is to provide a metal material having a coating formed from such coating composition for the metal.

The inventors of the present invention made an intensive study to realize the objects as described above, and found that coating composition for a metal prepared by blending the synthetic resin and the filler which constitute the base of the coating composition with a mixture of an acetylene glycol surfactant and a polyoxyalkylene alkyl ether having an HLB of a particular range exhibits an excellent rust preventive properties simultaneously with improved water resistance and high adhesion to the metal. The present invention has been completed on the basis of such finding.

Accordingly, this invention provides a coating composition for a metal comprising
100 parts by weight of a synthetic resin solid content (A);
1 to 200 parts by weight of a filler (B); and
0.01 to 10 parts by weight of a mixture of
(C-1) 10 to 90% by weight of at least one member selected from
an acetylene glycol represented by the following general formula (1):

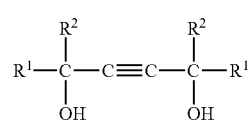

(1)

wherein $R^1$ and $R^2$ are respectively an alkyl group containing 1 to 5 carbon atoms,
an ethylene oxide-propylene oxide block adduct of an acetylene glycol represented by the following general formula (2):

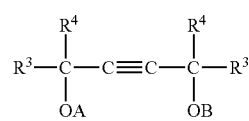

(2)

wherein $R^3$ and $R^4$ are respectively an alkyl group containing 1 to 5 carbon atoms;
A is $-(C_2H_4O)_{w1}-(C_3H_6O)_{x1}-(C_2H_4O)_{y1}-(C_3H_6O)_{z1}-H$; and
B is $-(C_2H_4O)_{w2}-(C_3H_6O)_{x2}-(C_2H_4O)_{y2}-(C_3H_6O)_{z2}-H$;
wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100);
an ethylene oxide-propylene oxide random adduct of an acetylene glycol represented by the following general formula (3):

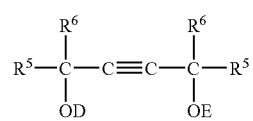

(3)

wherein $R^5$ and $R^6$ are respectively an alkyl group containing 1 to 5 carbon atoms; D is $-(C_2H_4O/C_3H_6O)_m-H$; and E is $-(C_2H_4O/C_3H_6O)_n-H$; wherein m and n are respectively 0 or a positive number of 0.5 to 50, and m+n is 1 to 100);

(C-2) 10 to 90% by weight of at least one polyoxyalkylene alkyl ether having an HLB of 8 to 18 represented by the following general formula (4):

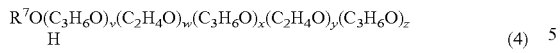
(4)

wherein $R^7$ is an alkyl group containing 1 to 20 carbon atoms; v, w, x, y, and z are respectively 0 or a positive number of 1 to 20; with the proviso v+w+x+y+z>0, and
(C-3) 0 to 25% by weight of water and/or a water soluble organic solvent.

EFFECTS OF THE INVENTION

The present invention provides a coating composition for a metal not containing a rust preventive pigment, but which exhibits excellent rust preventive property as well as improved water resistance and good adhesion to the metal.

The coating composition for a metal of the present invention can be directly applied to the metal surface without being repelled or causing coating inconsistency even if an oily substance such as an oil film is present on the metal surface, and when applied.

DESCRIPTION OF THE PREFERRED EMBODIMENTS

This invention relates to a coating composition for a metal comprising
100 parts by weight of a synthetic resin solid content (A);
1 to 200 parts by weight of a filler (B); and
0.01 to 10 parts by weight of a mixture of
(C-1) 10 to 90% by weight of at least one member selected from
an acetylene glycol represented by the following general formula (1):

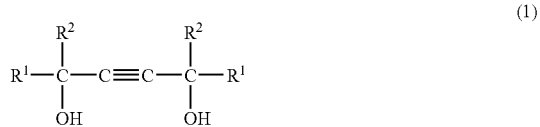
(1)

wherein $R^1$ and $R^2$ are respectively an alkyl group containing 1 to 5 carbon atoms,
an ethylene oxide-propylene oxide block adduct of an acetylene glycol represented by the following general formula (2):

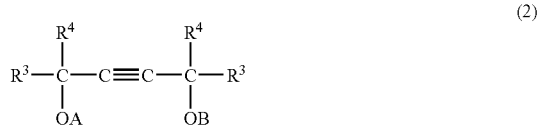
(2)

wherein $R^3$ and $R^4$ are respectively an alkyl group containing 1 to 5 carbon atoms;
A is $-(C_2H_4O)_{w1}-(C_3H_6O)_{x1}-(C_2H_4O)_{y1}-(C_3H_6O)_{z1}-H$; and
B is $-(C_2H_4O)_{w2}-(C_3H_6O)_{x2}-(C_2H_4O)_{y2}-(C_3H_6O)_{z2}-H$;
wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100);

an ethylene oxide-propylene oxide random adduct of an acetylene glycol represented by the following general formula (3):

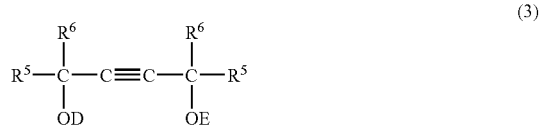
(3)

wherein $R^5$ and $R^6$ are respectively an alkyl group containing 1 to 5 carbon atoms; D is $-(C_2H_4O/C_3H_6O)_m-H$; and E is $-(C_2H_4O/C_3H_6O)_n-H$; wherein m and n are respectively 0 or a positive number of 0.5 to 50, and m+n is 1 to 100);
(C-2) 10 to 90% by weight of at least one polyoxyalkylene alkyl ether having an HLB of 8 to 18 represented by the following general formula (4):

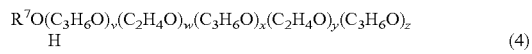
(4)

wherein $R^7$ is an alkyl group containing 1 to 20 carbon atoms; v, w, x, y, and z are respectively 0 or a positive number of 1 to 20; with the proviso that v+w+x+y+z is greater than 0, and preferably, that v+w+x+y+z is a positive number in the range of 0 to 18; and
(C-3) 0 to 25% by weight of water and/or a water soluble organic solvent.

The main component constituting the coating composition for a metal of the present invention is the component (A), and this component (A) is preferably at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and water soluble epoxy resin. Among these, the preferred in view of versatility and cost are (meth)acrylate resin emulsion, styrene-acrylate copolymer emulsion, vinyl acetate resin emulsion, and vinyl acetate-(meth)acrylate copolymer emulsion. The resin may be either the one produced by emulsion polymerization using a known polymerization method or a commercially available product. The emulsion used for the component (A) preferably has a solid content of 20 to 60% by weight, and more preferably, a solid content of 30 to 50% by weight.

The monomer containing an unsaturated group used for the component (A), and in particular, (meth)acrylate resin emulsion, styrene/acrylate copolymer emulsion, vinyl acetate resin emulsion, and vinyl acetate/(meth)acrylate copolymer emulsion is not particularly limited, and exemplary monomers include ethylene, propylene; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylate esters such as methyl acrylate, ethyl acrylate, butyl acrylate, 2-ethylhexyl acrylate, and methyl methacrylate; ethylenically unsaturated dicarboxylate esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid, and fumaric acid; epoxy group-containing monomers such as glycidyl methacrylate; alcohol group-containing monomers such as 2-hydroxyethyl methacrylate; alkoxyl group-containing monomers such as methoxyethyl acrylate; nitrile group-containing monomers such as acrylonitrile; amide group-containing monomer such as acrylamide; amino group-containing monomer such as dimethylaminoethyl methacrylate; and a monomer containing two or more ethylenically unsaturated groups such as divinylbenzene and allylmethacrylate. The emulsion polymerization may be conducted by using such monomers.

The emulsion polymerization may be accomplished by any emulsion polymerization method known in the art. The unsaturated group-containing monomer and other polymerization aids (such as an emulsifying agent such as alkyl sulfate ester salt, a polymerization initiator such as ammonium sulfate, a pH adjusting agent such as sodium carbonate, and various antifoaming agents) may be added at once at the initial stage of the reaction; continuously in the course of the reaction; or intermittently or in divided dose during the polymerization.

The emulsifying agent used in such emulsion polymerization include the surfactants as described in the following (1) to (4), and such surfactant may be used either alone or in combination of two or more.

(1) Anionic Surfactant

Surfactants such as alkyl sulfate ester salt, polyoxyethylene alkyl ether sulfate ester salt, alkyl benzene sulfonate, alkyl diphenyl ether disulfonate, alkyl naphthalene sulfonate, fatty acid salt, dialkyl sulfosuccinates salt, alkyl phosphate ester salt, and polyoxyethylene alkylphenyl phosphate ester salt.

(2) Nonionic Surfactant

Surfactant such as polyoxyethylene alkylphenyl ether, polyoxyethylene alkyl ether, polyoxyethylene fatty ester, sorbitan fatty acid ester, polyoxyethylene sorbitan fatty acid ester, polyoxyalkylene alkyl ether, polyoxyethylene derivative, glycerin fatty acid ester, polyoxyethylene hydrogenated castor oil, polyoxyethylene alkylamine, alkyl alkanol amide, or acetylene alcohol, acetylene glycol, and their ethylene oxide adduct.

(3) Cationic Surfactant

Surfactant such as alkyltrimethyl ammonium chloride, dialkyl dimethyl ammonium chloride, alkyl benzyl ammonium chloride, and alkylamine salt.

(4) Polymerizable surfactant having a radically polymerizable double bond in its molecule, for example, alkylallyl sulfosuccinate salt, methacryloyl polyoxyalkylene sulfate salt, and polyoxyethylene nonylpropenylphenyl ether sulfate salt.

Such surfactant may be used an amount of 0.3 to 20 parts by weight, and preferably at 0.5 to 10 parts by weight in relation to the unsaturated group-containing monomer.

The polymerization initiator used in such emulsion polymerization include persulfates such as ammonium persulfate and potassium persulfate; azo compounds such as 2,2'-diamidino-2,2'-azopropane dihydrochloride and azobisisobutyronitrile; and peroxides such as cumene hydroperoxide, benzoyl peroxide, and hydrogen peroxide. The polymerization initiator used may also be a known redox initiator, for example, potassium persulfuric and sodium hydrogen sulfite. Such polymerization initiator may be used at an amount of 0.1 to 5 parts by weight, and preferably at 0.2 to 2 parts by weight in relation to the unsaturated group-containing monomer.

The temperature used for the emulsion polymerization is generally 10 to 90° C., and preferably 50 to 80° C. The time used for the polymerization is 3 to 20 hours. The polymerization is preferably conducted in an inert atmosphere such as nitrogen gas.

The filler which is component (B) in the coating composition of the present invention is preferably at least one member selected from titanium, talc, kaolin, bentonite, mica, silica, heavy calcium carbonate, clay, precipitated barium sulfate, barium carbonate, glass beads, and resin beads.

The component (B) is used at an amount of 1 to 200 parts by weight, preferably 5 to 150 parts by weight, and most preferably 10 to 100 parts by weight in relation to 100 parts by weight of the solid content of the component (A). When the amount of component (B) is excessively low, the time required for drying of the coating will be unduly long, while an excessively high content of the component (B) may results in an increased viscosity and poor elongation rate of the coating, and the resulting coating will have a reduced strength.

Of the mixture incorporated in the coating composition for a metal of the present invention, the component (C-1) is at least one acetylene glycol or its adduct selected from the acetylene glycols represented by the general formula (1) and alkylene oxide adducts of the acetylene glycol represented by the general formula (2) and (3).

(C-1) In the acetylene glycol represented by the following general formula (1):

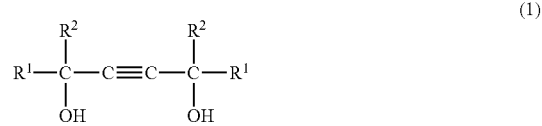

$R^1$ and $R^2$ are respectively an alkyl group containing 1 to 5 carbon atoms.

In the general formula (2):

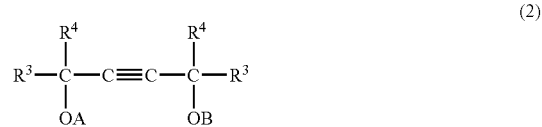

$R^3$ and $R^4$ are respectively an alkyl group containing 1 to 5 carbon atoms; A is $-(C_2H_4O)_{w1}-(C_3H_6O)_{x1}-(C_2H_4O)_{y1}-(C_3H_6O)_{z1}-H$; and B is $-(C_2H_4O)_{w2}-(C_3H_6O)_{x2}-(C_2H_4O)_{y2}-(C_3H_6O)_{z2}-H$, wherein w1, w2, x1, x2, y1, y2, z1, and z2 are respectively 0 or a positive number of 0.5 to 25; w1+w2+y1+y2 is 0.5 to 50, preferably 2.5 to 42.5, and more preferably 5 to 42.5; x1+x2+z1+z2 is 0.5 to 50, preferably 2.5 to 42.5, and more preferably 5 to 42.5; and w1+w2+x1+x2+y1+y2+z1+z2 is 1 to 100, preferably 5 to 85, and more preferably 10 to 85.

In the general formula (3):

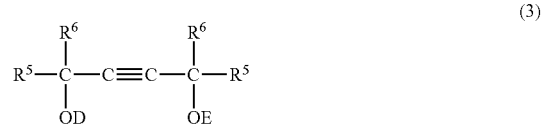

$R^5$ and $R^6$ are respectively an alkyl group containing 1 to 5 carbon atoms; D is $-(C_2H_4O/C_3H_6O)_m-H$; and E is $-(C_2H_4O/C_3H_6O)_n-H$, wherein m and n are respectively 0 or a positive number of 0.5 to 50, preferably 2.5 to 42.5, and m+n is 1 to 100, and preferably 5 to 85.

Examples of the acetylene glycol represented by the general formula (1) include:

2,5,8,11-tetramethyl-6-dodecyne-5,8-diol,
5,8-dimethyl-6-dodecyne-5,8-diol,
2,4,7,9-tetramethyl-5-decyne-4,7-diol,
4,7-dimethyl-5-decyne-4,7-diol,
2,3,6,7-tetramethyl-4-octyne-3,6-diol,
3,6-dimethyl-4-octyne-3,6-diol, and
2,5-dimethyl-3-hesyne-2,5-diol.

Exemplary ethylene oxide-propylene oxide block adduct of the acetylene glycol represented by the general formula (2) include:

alkylene oxide adduct of 2,5,6,11-tetramethyl-6-dodecyne-5,8-diol (molar number of the ethylene oxide added: 10, molar number of the propylene oxide added: 40, w1=2 moles, w2=2 moles, x1=8 moles, x2=8 moles, y1=3 moles, y2=3 moles, z1=12 moles, z2=12 moles), alkylene oxide adduct of 2,5,8,11-tetramethyl-6-dodecyne-5,8-diol (molar number of the ethylene oxide added: 40, molar number of the propylene oxide added: 10, w1=20 moles, w2=20 moles, x1=5 moles, x2=5 moles, y1, y2, z1, z2=0 mole), alkylene oxide adduct of 5,8-dimethyl-6-dodecyne-5,8-diol (molar number of the ethylene oxide added: 20, molar number of the propylene oxide added: 20, w1=7 moles, w2=7 moles, x1=10 moles, x2=10 moles, y1=3 moles, y2=3 moles, z1, z2=0 mole), alkylene oxide adduct of 5,8-dimethyl-6-dodecyne-5,8-diol (molar number of the ethylene oxide added: 20, molar number of the propylene oxide added: 20, w1, w2=0 mole, x1=10 moles, x2=10 moles, y1=10 moles, y2=10 moles, z1, z2=0 mole), alkylene oxide adduct of 2,4,7,9-tetramethyl-5-decyne-4,7-diol (molar number of the ethylene oxide added: 20, molar number of the propylene oxide added: 10, w1=3 moles, w2=3 moles, x1=1 mole, x2=1 mole, y1=7 moles, y2=7 moles, z1=4 moles, z2=4 moles), alkylene oxide adduct of 2,4,7,9-tetramethyl-5-decyne-4,7-diol (molar number of the ethylene oxide added: 20, molar number of the propylene oxide added: 10, w1=10 moles, w2=10 moles, x1=5 moles, x2=5 moles, y1, y2, z1, z2=0 mole), alkylene oxide adduct of 4,7-dimethyl-5-decyne-4,7-diol (molar number of the ethylene oxide added: 30, molar number of the propylene oxide added: 6, w1=7 moles, w2=7 moles, x1=3 moles, x2=3 moles, y1=8 moles, y2=8 moles, z1, z2=0 mole), alkylene oxide adduct of 4,7-dimethyl-5-decyne-4,7-diol (molar number of the ethylene oxide added: 30, molar number of the propylene oxide added: 6, w1, w2=0 mole, x1=1 mole, x2=1 mole, y1=1 5 moles, y2=1 5 moles, z1=2 moles, z2=2 moles), alkylene oxide adduct of 2,3,6,7-tetramethyl-4-octyne-3,6-diol (molar number of the ethylene oxide added: 8, molar number of the propylene oxide added: 4, w1=2 moles, w2=2 moles, x1=1 mole, x2=1 mole, y1=2 moles, y2=2 moles, z1=1 mole, z2=1 mole), alkylene oxide adduct of 3,6-diethyl-4-octyne-3,6-diol (molar number of the ethylene oxide added: 24, molar number of the propylene oxide added: 18, w1=5 moles, w2=5 moles, x1=9 moles, x2=9 moles, y1=7 moles, y2=7 moles, z1, z2=0 mole), alkylene oxide adduct of 3,6-dimethyl-4-octyne-3,6-diol (molar number of the ethylene oxide added: 36, molar number of the propylene oxide added: 26, w1=10 moles, w2=10 moles, x1=5 moles, x2=5 moles, y1=8 moles, y2=8 moles, z1=8 moles, z2=8 moles), and alkylene oxide adduct of 2,5-dimethyl-3-hexyne-2,5-diol (molar number of the ethylene oxide added: 44, molar number of the propylene oxide added: 40, w1=8 moles, w2=8 moles, x1=4 moles, x2=4 moles, y1=14 moles, y2=14 moles, z1=16 moles, z2=16 moles).

Exemplary ethylene oxide-propylene oxide random adduct of the acetylene glycol represented by the general formula (3) include:

alkylene oxide adduct of 2,5,8,11-tetramethyl-6-dodecyne-5,8-diol (molar number of the ethylene oxide added: 20, molar number of the propylene oxide added: 20, m=20 moles, n=20 moles), alkylene oxide adduct of 5,8-dimethyl-6-dodecyne-5,8-diol (molar number of the ethylene oxide added: 10, molar number of the propylene oxide added: 10, m=12 moles, n=8 moles), alkylene oxide adduct of 2,4,7,9-tetramethyl-5-decyne-4,7-diol (molar number of the ethylene oxide added: 15, molar number of the propylene oxide added: 15, m=13 moles, n=17 moles), alkylene oxide adduct of 4,7-dimethyl-5-decyne-4,7-diol (molar number of the ethylene oxide added: 27, molar number of the propylene oxide added: 27, m=27 moles, n=27 moles), alkylene oxide adduct of 2,3,6,7-tetramethyl-4-octyne-3,6-diol (molar number of the ethylene oxide added: 2.5, molar number of the propylene oxide added: 2.5, m=2.5 moles, n=2.5 moles), alkylene oxide adduct of 3,6-diethyl-4-octyne-3,6-diol (molar number of the ethylene oxide added: 21, molar number of the propylene oxide added: 21, m=20 moles, n=22 moles), alkylene oxide adduct of 3,6-dimethyl-4-octyne-3,6-diol (molar number of the ethylene oxide added: 31, molar number of the propylene oxide added: 31, m=27 moles, n=3 5 moles), and alkylene oxide adduct of 2,5-dimethyl-3-hesyne-2,5-diol (molar number of the ethylene oxide added: 42, molar number of the propylene oxide added: 42, m=42 moles, n=42 moles).

Total molar number of the alkylene oxide added in the general formulae (2) and (3) is 1 to 100 moles, preferably 5 to 85 moles, and more preferably 10 to 85 moles. When the molar number of the alkylene oxide unit added exceeds 100 moles, the compound will have an increased hydrophilicity which results in the decrease of affinity with the metal. This invites loss of rust preventive properties, adhesion, and water resistance.

Total molar number of the ethylene oxide added in the general formulae (2) and (3) is preferably 0.5 to 50 moles, and more preferably 10 to 40 moles, and the molar number of the propylene oxide added is preferably 0.5 to 50 moles, and more preferably 10 to 40 moles. When the total molar number of the ethylene oxide added exceeds 50 moles, the effect of removing the bubbles by gas purging by the liquid may become impaired to invite increase in the number of pin holes in the resulting coating. The total molar number of less than 0.5 moles may invite loss of miscibility in the preparation of the coating composition. In the meanwhile, when molar number of the propylene oxide added exceeds 50 moles, solubility will be reduced and this may invite aggregation of the composition. The total molar number of less than 0.5 moles may invite loss of miscibility in the preparation of the coating composition.

The acetylene glycol or its adduct [component (C-1)] as described above may be used alone or in combination of two or more, and in preparing the coating composition for a metal of the present invention, the component (C-1) may be used at an amount of 10 to 90% by weight, and preferably at 20 to 80% by weight in relation to the total of the components (C-1) and (C-2) and the component (C-3) as described below. When this amount exceeds 90% by weight, solubility in water may become insufficient when used in preparing an aqueous coating composition, and when used at an amount of less than 10% by weight, the effect of bubble removal by gas purging with the liquid may become insufficient to invite defects such as increase in the number of pin holes formed in the resulting coating.

The component (C-1) may preferably have a sodium content of up to 1,000 ppm (0 to 1,000 ppm). Use of the component (C-1) with the sodium content less than such amount will prevent loss of rust preventive properties and water resistance. In order to enhance such effect, the component (C-1) may preferably have a potassium content of up to 2,000 ppm (0 to 2,000 ppm). The sodium content and the potassium content may be controlled to such range, for example, by purification of the acetylene glycol, use of highly purified starting materials, and synthesis of the acetylene glycol in a production environment that will prevent contamination of the metal. The coating composition is preferably applied to a metal such as iron, steel, copper, and aluminum, and the metal may be a surface treated metal.

The component (C-1) included the mixture has triple bond in its molecule, and this triple bond is postulated to realize the high affinity with the metal such as iron, steel, copper, and aluminum, and formation of the dense metal, and accordingly the coating formed will exhibit excellent adhesion and rust preventive properties. The component (C-1) also has a hydrophobic group in its structure, and the composition is less likely to entrain water, and accordingly, the coating exhibits excellent water resistance.

In the meanwhile, the component (C-2) is at least one polyoxyalkylene alkyl ether having an HLB of 8 to 18 represented by the following general formula (4):

$$R^7O(C_3H_6O)_v(C_2H_4O)_w(C_3H_6O)_x(C_2H_4O)_y(C_3H_6O)_zH \qquad (4)$$

wherein $R^7$ represents an alkyl group containing 1 to 20 carbon atoms; v, w, x, y, and z are independently 0 or a positive number of 1 to 20; and v+w+x+y+z is greater than 0, and preferably a positive number of 1 to 80.

The polyoxyalkylene ether of the component (C-2) blended with the acetylene glycol or its adduct of the component (C-1) may be the polyoxyalkylene alkyl ether represented by the general formula (4), and examples include:
$C_{12}H_{25}O(C_2H_4O)_6(C_3H_6O)_2(C_2H_4O)_6(C_3H_6O)_8H$,
$C_{13}H_{27}O(C_2H_4O)_6(C_3H_6O)_2(C_2H_4O)_6(C_3H_6O)_8H$,
$C_{12}H_{25}O(C_2H_4O)_w(C_3H_6O)_x(C_2H_4O)_y(C_3H_6O)_zH$ (wherein w+y=15, x+z=4),
$C_{13}H_{27}O(C_2H_4O)_w(C_3H_6O)_x(C_2H_4O)_y(C_3H_6O)_zH$ (wherein w+y=15, x+z=4),
$C_{12}H_{25}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{13}H_{27}O(C_2H_4O)_8(C_3H_6O)_2(C_2H_4O)_6H$,
$C_{12}H_{25}O(C_2H_4O)_{12}(C_3H_6O)_2(C_2H_4O)_{12}H$,
$C_{13}H_{27}O(C_2H_4O)_{12}(C_3H_6O)_2(C_2H_4O)_{12}H$,
$CH_3(CH_2)_9(CH_3)CHO(C_2H_4O)_7(C_3H_6O)_{4.5}H$,
$CH_3(CH_2)_{11}(CH_3)CHO(C_2H_4O)_7(C_3H_6O)_{4.5}H$,
$CH_3(CH_2)_9(CH_3)CHO(C_2H_4O)_5(C_3H_6O)_{3.5}H$,
$CH_3(CH_2)_{11}(CH_3)CHO(C_2H_4O)_5(C_3H_6O)_{3.5}H$,
$C_{14}H_{29}O(C_2H_4O)_{14}(C_3H_6O)_2H$,
$C_{14}H_{29}O(C_2H_4O)_{14}(C_3H_6O)_2H$,
$C_{16}H_{33}O(C_3H_6O)_4(C_2H_4O)H$,
$C_{16}H_{33}O(C_3H_6O)_4(C_2H_4O)_{10}H$,
$C_{16}H_{33}O(C_3H_6O)_4(C_2H_4O)_{20}H$,
$C_{16}H_{33}O(C_3H_6O)_8(C_2H_4O)_{20}H$,
$C_{18}H_{37}O(C_3H_6O)_{20}(C_2H_4O)_{1.5}H$,
$C_{16}H_{33}O(C_3H_6O)_4(C_2H_4O)_{10}(C_3H_6O)_4(C_2H_4O)_{10}H$, and
$C_{16}H_{33}O(C_3H_6O)_4(C_2H_4O)_{19}(C_3H_6O)_4H$,
which may be used alone or in combination of two or more. When the component (C-2) has an HLB of less than 8, solubility in water will be insufficient, while the HLB in excess of 18 may result in an inconsistent coating.

Amount of the component (C-2) used in preparing the surfactant composition of the present invention is 10 to 90% by weight, and preferably 20 to 60% by weight of the total amount of the components (C-1) and (C-2) and the component (C-3) as described below. When the content of the component (C-2) is less than 10% by weight, solubilization of the component (C-1) may be insufficient. On the other hand, content in excess of 90% by weight may result in an insufficient purging of the gas with the liquid with regard to the bubbles generated in the preparation of the coating composition, and this may invite increase in the number of pin holes formed in the resulting coating.

In present invention, the component (C-1) and the component (C-2) are preferably used so that the total of the components (C-1) and (C-2) constitutes 100% by weight. However, the coating composition of the present invention may also include pure water or a water soluble organic solvent such as ethyleneglycol, diethylene glycol, triethylene glycol, tetraethylene glycol, polyethylene glycol, propylene glycol, dipropylene glycol, 1,3-propanediol, 1,4-butanediol, or glycerin as the component (C-3). This component (C-3) may be used to constitute 0 to 25% by weight, and preferably 5 to 20% by weight of the total amount of the components (C-1), (C-2), and (C-3) as long as such inclusion does not adversely affect the properties of the coating composition for the metal of the present invention.

The mixture of the components (C-1), (C-2), and (C-3) may be incorporated at 0.01 to 10 parts by weight, preferably at 0.1 to 5 parts by weight, and more preferably at 0.2 to 2 parts by weight in relation to 100 parts by weight of the solid content of the component (A). Incorporation of the mixture at an excessively low content may invite a coating failure and the coating composition may be repelled in the coating. On the other hand, incorporation of the mixture at an excessive amount may also invite coating failure due to increase in the bubbling.

The coating composition for a metal of the present invention is produced by mixing the components as described above, for example, by a mixing method known in the art using a propeller blender. If desired, the component which is solid at room temperature may be added after heating.

The coating composition for a metal of the present invention may have additives incorporated therein to the extent that does not adversely affect the performance of the coating composition. The additives may be selected from, for example, humectant, dispersant, antifoaming agent, coating aid, freeze stabilizer, leveling agent, light stabilizer, and antiseptic.

The coating composition produced as described above may be used by coating on a plate, a molded article, and the like of a metal selected from iron, steel, copper, and aluminum by a method known in the art using a brush, bar coater, roll coater, and like preferably to a dry coating thickness of 1 to 1,000 μm. If desired, the coated article may be heated to an elevated temperature.

EXAMPLES

Next, the present invention is described in further detail by referring to the Examples and Comparative Examples which by no means limit the scope of the present invention. The parts and % in the Examples indicate parts by weight and % by weight, respectively.

Examples and Comparative Examples

Amount of the components (C-1), (C-2), and (C-3) blended in the coating composition are shown in Table 1.
<Mix of (C-1) and (C-2) or (C-1), (C-2) and (C-3)>

TABLE 1

| Amount (% by weight) | | Example | | | | | | Comparative Example | | | | | |
|---|---|---|---|---|---|---|---|---|---|---|---|---|---|
| | | M-1 | M-2 | M-3 | M-4 | M-5 | M-6 | M-7 | M-8 | M-9 | M-10 | M-11 | M-12 |
| Component (C-1) | Na content (ppm) | 500 | 700 | 500 | 700 | 500 | 1200 | 500 | 500 | 500 | 700 | 500 | 500 |
| | C-1-1 | 40 | | | | 55 | | 40 | 60 | 5 | | | 60 |
| | C-1-2 | | 30 | | | | | | | | 95 | | |
| | C-1-3 | | | 20 | | | | | | | | | |
| | C-1-4 | | | | 40 | | | | | | | | |
| | C-1-4' | | | | | | 40 | | | | | | |
| | C-1-5 | | | | | | | | | | | 40 | |
| Component (C-2) | C-2-1 | 40 | | 80 | | | | | | | | 40 | |
| | C-2-2 | | 50 | | 60 | | 60 | | | 95 | 5 | | |
| | C-2-3 | | | | | | | 60 | | | | | |
| | C-2-4 | | | | | | | | 40 | | | | |
| | C-2-5 | | | | | 45 | | | | | | | |
| | C-2-6 | | | | | | | | | | | | 40 |
| Component (C-3) | EG | 20 | | | | | | | | | | | |
| | PG | | 20 | | | | | | | | | | |
| | Pure water | | | | | | | | | | | 20 | |

Component (C-1)
C-1-1: 2,4,7,9-tetramethyl-5-decyne-4,7-diol,
C-1-2: alkylene oxide adduct of 2,4,7,9-tetramethyl-5-decyne-4,7-diol (molar number of the ethylene oxide added: 20, molar number of the propylene oxide added: 10, w1=3 moles, w2=3 moles, x1=1 mole, x2=1 mole, y1=7 moles, y2=7 moles, z1=4 moles, z2=4 moles),
C-1-3: alkylene oxide adduct of 2,4,7,9-tetramethyl-5-decyne-4,7-diol (molar number of the ethylene oxide added: 15, molar number of the propylene oxide added: 15, m=13 moles, n=17 moles),
C-1-4: alkylene oxide adduct of 2,5-dimethyl-3-hesyne-2,5-diol (molar number of the ethylene oxide added: 42, molar number of the propylene oxide added: 42, m=42 moles, n=42 moles),
C-1-4': alkylene oxide adduct of 2,5-dimethyl-3-hesyne-2,5-diol (molar number of the ethylene oxide added: 42, molar number of the propylene oxide added: 42, m=42 moles, n=42 moles),
C-1-5: alkylene oxide adduct of 2,5,8,11-tetramethyl-6-dodecyne-5,8-diol (molar number of the ethylene oxide added: 60, molar number of the propylene oxide added: 60, m=60 moles, n=60 moles)

Component (C-2)
C-2-1: Noigen ET-116B (product name; manufactured by Dai-Ichi Kogyo Seiyaku Co., Ltd.; $R^7O(C_2H_4O)_w(C_3H_6O)_xH$, wherein $R^7$ is an alkyl containing 12 or 14 carbon atoms, w is 7, and x is 4.5; HLB, 12.0),
C-2-2: Noigen DL-0415(product name; manufactured by Dai-Ichi Kogyo Seiyaku Co., Ltd.; $R^7O(C_2H_4O)_w(C_3H_6O)_x(C_2H_4O)_y(C_3H_6O)_zH$, wherein $R^7$ is an alkyl containing 12 or 13 carbon atoms, w+y is 15, and x+z is 4; HLB, 15.0).
C-2-3: Noigen YX-400(product name; manufactured by Dai-Ichi Kogyo Seiyaku Co., Ltd.; $R^7O(C_2H_4O)_wH$, wherein $R^7$ is an alkyl containing 12 carbon atoms, and w is 40; HLB, 18.1)
C-2-4: Noigen DH-0300(product name; manufactured by Dai-Ichi Kogyo Seiyaku Co., Ltd.; $R^7O(C_2H_4O)_wH$, wherein $R^7$ is an alkyl containing 14 carbon atoms, and w is 2; HLB, 4.0)
C-2-5: Nikkol PBC-33(product name; manufactured by Nikko Chemicals; $CH_3(CH_2)_{14}CH_2O(C_3H_6O)_4(C_2H_4O)_{10}H$; HLB, 10.5)
C-2-6: Nikkol PEN4630(product name; manufactured by Nikko Chemicals, $C_{24}H_{49}(C_3H_6O)_6(C_2H_4O)_{30}H$; HLB, 12.0)

Component (C-3)
EG: ethyleneglycol
PG: propylene glycol

Na was quantitatively determined by ICP emission spectrophotometer (IRIS Intorepid II XSP).

[Preparation of the Coating Composition]

50 parts of Vinyblan 2583 (product name of an acryl emulsion manufactured by Nissin Chemical Industry Co., Ltd., solid content, 45%), 30 parts of the filler paste as described below, 15 parts of ion exchanged water, 4 parts of 5% aqueous solution of adipic acid dihydrazide, and 1 part of the mix (M-1 to M-12) were mixed to produce the coating composition for evaluation.

[Preparation of Filler Paste]

70 parts of titanium dioxide (Typaque R-780 manufactured by Ishihara Sangyo Kaisha Ltd.), 0.5 parts of antifoaming agent (Surfynol DF-58 manufactured by Air Products), 5 parts of pigment dispersant (Dispersant BYK-190 manufactured by BYK-Chemie GmbH), and 24.5 parts of ion exchanged water were mixed, and dispersed with Disper to produce the pigment paste.

[Preparation of the Sample Coated with the Coating Composition for the Metal]

The coating composition was applied on a zinc plated steel plate to a dry thickness of 10 μm, and then dried at 110° C. for 10 minutes to thereby produce a test plate for evaluation.

[Evaluation of the Performance of the Coating Composition]

Viscosity

The viscosity was measured by using a paddle viscometer (23° C.).

pH

The pH was measured according to JIS Z 8802 by using the sample with no further treatment.

Rust Preventive Properties

The rust preventive properties were evaluated by salt spray test of the test plate according to JIS K 5600.

After the test, rust generation, adhesion, and appearance of the coating were evaluated by the following criteria:

⊚: No rust observed at the cut. Adhesion of 100/100.

○: Red rust at the cut of up to 5%.

Δ: Red rust at the cut of 6 to 20%.

x: Red rust at the cut of in excess of 20%.

Adhesion

The adhesion was evaluated by crosscut test according to JIS K 5600.

The coating was observed after applying and peeling an adhesive tape, and the percentage of the non-peeled area is shown in the Table.

Water Resistance

The water resistance was evaluated by immersing the test plate which is the same as the one used for evaluating the adhesion in a warm water of 50° C. for 10 days, and evaluating outer appearance of the coating (discoloration, swelling, peeling, etc.) and adhesion.

⊚: No change in the outer appearance of the coating, with the adhesion of 100/100.

○: Swelling at the cuts with the adhesion of 80/100 or higher.

Δ: Swelling at the cuts with the adhesion of 50/100 or higher.

x: Swelling at the cuts with the adhesion of less than 50/100.

The results are shown in Table 2.

TABLE 2

| Blend | Example | | | | | | Comparative Example | | | | | |
|---|---|---|---|---|---|---|---|---|---|---|---|---|
|  | M-1 | M-2 | M-3 | M-4 | M-5 | M-6 | M-7 | M-8 | M-9 | M-10 | M-11 | M-12 |
| Viscosity (KV) | 70 | 70 | 70 | 70 | 70 | 72 | 72 | 72 | 72 | 72 | 72 | 72 |
| PH | 9 | 9 | 9 | 9 | 9 | 9 | 9 | 9 | 9 | 9 | 9 | 9 |
| Rust preventive properties | ⊚ | ⊚ | ⊚ | ⊚ | ⊚ | ○ | X | X | X | Δ | X | X |
| Water resistance | ⊚ | ○ | ○ | ⊚ | ⊚ | Δ | X | Δ | X | Δ | X | Δ |
| Adhesion | 100 | 100 | 80 | 100 | 100 | 40 | 40 | 60 | 20 | 40 | 20 | 40 |

Japanese Patent Application No. 2006-243740 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A metal material comprising:

a substrate selected from the group consisting of iron, steel, copper, aluminum, and zinc plated steel; and a coating of a coating composition which is formed on the surface of the substrate, wherein the coating composition comprises:

(A) 100 parts by weight of at least one synthetic resin solid content selected from the group consisting of (meth) acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin;

(B) 1 to 200 parts by weight of at least one filler selected from the group consisting of titanium dioxide, talc, kaolin, bentonite, mica, silica, heavy calcium carbonate, clay, precipitated barium sulfate, carbonic acid barium, glass beads, and resin beads; and (C) 0.01 to 10 parts by weight of a mixture of (C-1) 10 to 90% by weight of at least one member selected from an acetylene glycol represented by the following general formula (1):

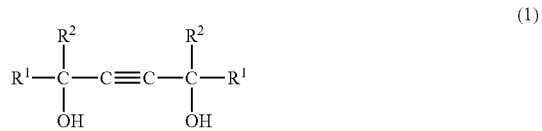

(1)

wherein $R^1$ and $R^2$ are respectively an alkyl group containing 1 to 5 carbon atoms;

an ethylene oxide-propylene oxide block adduct of an acetylene glycol represented by the following general formula (2):

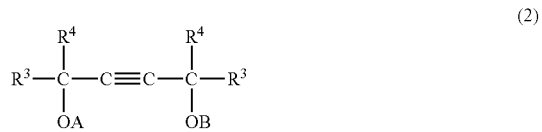

(2)

wherein $R^3$ and $R^4$ are respectively an alkyl group containing 1 to 5 carbon atoms, A is $-(C_2H_4O)_{w1}-(C_3H_6O)_{x1}-(C_2H_4O)_{y1}-(C_3H_6O)_{z1}-H$, and B is $-(C_2H_4O)_{w2}-(C_3H_6O)_{x2}-(C_2H_4O)_{y2}-(C_3H_6O)_{z2}-H$, wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100; and ethylene oxide-propylene oxide random adducts of an acetylene glycol represented by the following general formula (3):

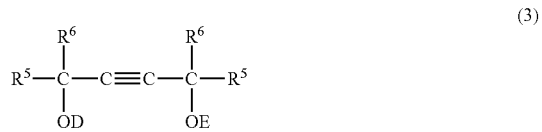

(3)

wherein $R^5$ and $R^6$ are respectively an alkyl group containing 1 to 5 carbon atoms, D is $-(C_2H_4O/C_3H_6O)_m-H$, and E is —$(C_2H_4O/C_3H_6O)_n$—H; wherein m and n are respectively 0 or a positive number of 0.5 to 50, and m+n is 1 to 100;

(C-2) 10 to 90% by weight of at least one polyoxyalkylene alkyl ether having both ethylene oxide and propylene oxide units and having an HLB of 8 to 18 represented by the following general formula (4):

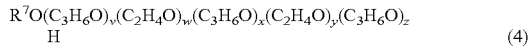
(4)

wherein $R^7$ is an alkyl group containing 1 to 20 carbon atoms, v, w, x, y, and z are respectively 0 or a positive number of 1 to 20, with the proviso v+w+x+y+z>0; and (C-3) 0 to 25% by weight of water and/or water soluble organic solvent.

2. The metal material according to claim 1, wherein the component (C-1) has a sodium content of up to 1,000 ppm and/or a potassium content of up to 2,000 ppm.

3. The metal material according to claim 1, wherein the metal material is produced by applying the coating composition on the metal surface to form a coating thereon.

4. The metal material according to claim 3, wherein the component (C-1) has a sodium content of up to 1,000 ppm and/or a potassium content of up to 2,000 ppm.

5. The metal material according to claim 3, wherein the metal on which the coating composition is applied is iron, steel, copper, or aluminum.

6. A metal material consisting essentially of:
a substrate selected from the group consisting of iron, steel, copper, aluminum, and zinc plated steel; and
a coating of a coating composition which is formed on the surface of the substrate, wherein the coating composition comprises:
(A) 100 parts by weight of at least one synthetic resin solid content selected from the group consisting of (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin;
(B) 1 to 200 parts by weight of at least one filler selected from the group consisting of titanium dioxide, talc, kaolin, bentonite, mica, silica, heavy calcium carbonate, clay, precipitated barium sulfate, carbonic acid barium, glass beads, and resin beads; and
(C) 0.01 to 10 parts by weight of a mixture of
(C-1) 10 to 90% by weight of at least one member selected from an acetylene glycol represented by the following general formula (1):

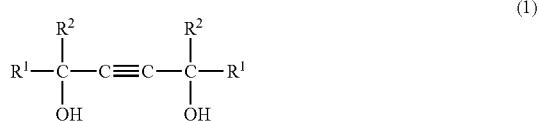
(1)

wherein $R^1$ and $R^2$ are respectively an alkyl group containing 1 to 5 carbon atoms;

an ethylene oxide-propylene oxide block adduct of an acetylene glycol represented by the following general formula (2):

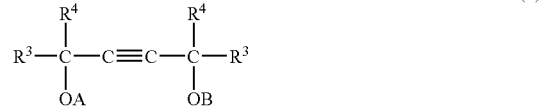
(2)

wherein $R^3$ and $R^4$ are respectively an alkyl group containing 1 to 5 carbon atoms, A is —$(C_2H_4O)_{w1}$—$(C_3H_6O)_{x1}$—$(C_2H_4O)_{y1}$—$(C_3H_6O)_{z1}$—H, and B is —$(C_2H_4O)_{w2}$—$(C_3H_6O)_{x2}$—$(C_2H_4O)_{y2}$—$(C_3H_6O)_{z2}$—H, wherein w1, w2, x1, x2, y1, y2, z1, and z2 are respectively 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100; and ethylene oxide-propylene oxide random adducts of an acetylene glycol represented by the following general formula (3):

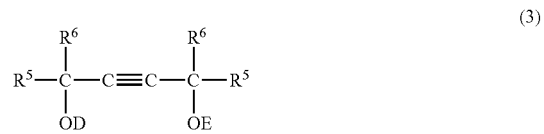
(3)

wherein $R^5$ and $R^6$ are respectively an alkyl group containing 1 to 5 carbon atoms, D is —$(C_2H_4O/C_3H_6O)_m$—H, and E is —$(C_2H_4O/C_3H_6O)_n$—H; wherein m and n are respectively 0 or a positive number of 0.5 to 50, and m+n is 1 to 100;

(C-2) 10 to 90% by weight of at least one polyoxyalkylene alkyl ether having both ethylene oxide and propylene oxide units and having an HLB of 8 to 18 represented by the following general formula (4):

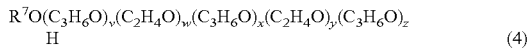
(4)

wherein $R^7$ is an alkyl group containing 1 to 20 carbon atoms, v, w, x, y, and z are respectively 0 or a positive number of 1 to 20, with the proviso v+w+x+y+z>0; and (C-3) 0 to 25% by weight of water and/or water soluble organic solvent.

7. The metal material according to claim 6, wherein the component (C-1) has a sodium content of up to 1,000 ppm and/or a potassium content of up to 2,000 ppm.

8. The metal material according to claim 6, wherein the metal material is produced by applying the coating composition on the metal surface to form a coating thereon.

9. The metal material according to claim 8, wherein the component (C-1) has a sodium content of up to 1,000 ppm and/or a potassium content of up to 2,000 ppm.

10. The metal material according to claim 8, wherein the metal on which the coating composition is applied is iron, steel, copper, or aluminum.

* * * * *